United States Patent
Kneckt et al.

(10) Patent No.: US 10,823,829 B2
(45) Date of Patent: Nov. 3, 2020

(54) DETERMINING DISTANCES

(71) Applicant: Nokia Technologies Oy, Espoo (FI)

(72) Inventors: Jarkko Kneckt, Espoo (FI); Olli Alanen, Vantaa (FI); Mika Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 498 days.

(21) Appl. No.: 15/571,144

(22) PCT Filed: May 22, 2015

(86) PCT No.: PCT/FI2015/050353
§ 371 (c)(1),
(2) Date: Nov. 1, 2017

(87) PCT Pub. No.: WO2016/189186
PCT Pub. Date: Dec. 1, 2016

(65) Prior Publication Data
US 2018/0172812 A1    Jun. 21, 2018

(51) Int. Cl.
*H04W 24/00* (2009.01)
*G01S 11/02* (2010.01)
*G01S 5/14* (2006.01)
*H04W 64/00* (2009.01)
*G01S 13/76* (2006.01)
*G01S 11/08* (2006.01)
*H04W 88/02* (2009.01)
*H04M 1/725* (2006.01)

(52) U.S. Cl.
CPC ............... *G01S 11/02* (2013.01); *G01S 5/14* (2013.01); *G01S 11/08* (2013.01); *G01S 13/765* (2013.01); *H04W 64/00* (2013.01); *H04M 1/72519* (2013.01); *H04M 1/72522* (2013.01); *H04W 88/02* (2013.01)

(58) Field of Classification Search
CPC . G01S 11/02; G01S 5/14; G01S 11/08; G01S 13/765; H04W 64/99; H04W 88/02; H04W 8/245; H04M 1/72519; H04M 1/72522
USPC ................... 455/456.1, 456.6, 418; 370/229
See application file for complete search history.

(56) References Cited

U.S. PATENT DOCUMENTS 8,593,948 B1 * 11/2013 Orii ................ H04L 12/66
                                                         370/229
9,237,585 B2 * 1/2016 Abraham .......... H04W 72/1289
(Continued)

OTHER PUBLICATIONS

"Fine Timing Measurement", IEEE P802.11-REVmdD4.0, Jan. 2015, pp. 1050-1743.
(Continued)

*Primary Examiner* — Danh C Le
(74) *Attorney, Agent, or Firm* — Harrington & Smith

(57) ABSTRACT

This document discloses a solution for determining distances. In the solution, a first frame is transmitted (200) to a second apparatus; a second frame is received (202) from the second apparatus, as response to the first frame; an indication of the duration between the reception time of the first frame and transmission of the second frame is received (204); an indication whether the duration is constant or variable is received (206); and in case the duration is constant, the distance between the first apparatus and the second apparatus is determined (208) based at least partly on the indication of the duration.

20 Claims, 3 Drawing Sheets

(56) References Cited

U.S. PATENT DOCUMENTS

| | | | |
|---|---|---|---|
| 9,439,105 B2* | 9/2016 | Soomro | H04L 1/188 |
| 2005/0265503 A1 | 12/2005 | Rofheart et al. | |
| 2008/0102753 A1* | 5/2008 | Brunel | H04L 27/2607 |
| | | | 455/39 |
| 2008/0259896 A1 | 10/2008 | Sahinoglu et al. | |
| 2010/0128617 A1 | 5/2010 | Aggarwal et al. | |
| 2014/0064264 A1* | 3/2014 | Morita | H04J 13/0014 |
| | | | 370/350 |
| 2014/0079050 A1* | 3/2014 | Tandai | H04W 52/48 |
| | | | 370/345 |
| 2014/0253295 A1 | 9/2014 | Roberts et al. | |
| 2017/0149547 A1* | 5/2017 | Kim | H04L 1/1864 |
| 2017/0180453 A1* | 6/2017 | Lee | H04L 65/607 |
| 2018/0088223 A1* | 3/2018 | Yano | G01S 13/20 |

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications", IEEE Std 802.11™-2012, Mar. 29, 2012, 2793 pages.

"International Search Report and Written Opinion received for corresponding Patent Cooperation Treaty Application No. PCT/FI2015/050353, dated Sep. 21, 2015, 16 pages."

Hoene et al., "Four-Way TOA and Software-Based Trilateration of IEEE 802.11 Devices", IEEE 19th International Symposium on Personal, Indoor and Mobile Radio Communications (PIMRC), Sep. 15-18, 2008, 6 pages.

* cited by examiner

DETERMINING DISTANCES

RELATED APPLICATION

This application was originally filed as PCT Application No. PCT/FI2015/050353 filed May 22, 2015.

TECHNICAL FIELD

The invention relates to the field of wireless communications.

BACKGROUND

In wireless communication systems there may be situations for a transceiver when it might be useful to be able to know the location of another transceiver or distance to the transceiver. Some applications work with nearby devices. For example, a printer device supporting wireless communications might be present for devices which are geographically close to it. In another example, a device might transmit information to devices which are within a given distance from it but ignore other devices.

BRIEF DESCRIPTION

According to an aspect of the invention, there is provided an apparatus comprising at least one processor and at least one memory including computer program code, the at least one memory and the computer program code configured to, with the at least one processor, cause the apparatus at least to: transmit a first frame to a second apparatus; receive a second frame from the second apparatus, as response to the first frame; receive an indication of the duration between the reception time of the first frame and transmission of the second frame; receive an indication whether the duration is constant or variable; and in case the duration is constant, determine the distance between the apparatus and the second apparatus based at least partly on the indication of the duration.

According to an aspect of the invention, there is provided an apparatus comprising at least one processor and at least one memory including computer program code, the at least one memory and the computer program code configured to, with the at least one processor, cause the apparatus at least to: receive a first frame from a first apparatus; receive a second frame from the second apparatus, as response to the first frame; receive an indication of the duration between the reception time of the first frame and transmission of the second frame; receive an indication whether the duration is constant or variable; and in case the duration is constant, determine the a parameter related to the distance between the apparatus and first apparatus and the second apparatus based at least partly on the indication of the duration.

According to another aspect of the invention, there is provided a method in a first apparatus, comprising: transmitting a first frame to a second apparatus; receiving a second frame from the second apparatus, as response to the first frame; receiving an indication of the duration between the reception time of the first frame and transmission of the second frame; receiving an indication whether the duration is constant or variable; and in case the duration is constant, determining the distance between the first apparatus and the second apparatus based at least partly on the indication of the duration.

According to another aspect of the invention, there is provided a method in an apparatus, comprising: receiving a first frame from a first apparatus; receiving a second frame from the second apparatus, as response to the first frame; receiving an indication of the duration between the reception time of the first frame and transmission of the second frame; receiving an indication whether the duration is constant or variable; and in case the duration is constant, determining the a parameter related to the distance between the apparatus and first apparatus and the second apparatus based at least partly on the indication of the duration.

Some embodiments of the invention are defined in dependent claims.

BRIEF DESCRIPTION OF THE DRAWINGS

Embodiments of the present invention are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
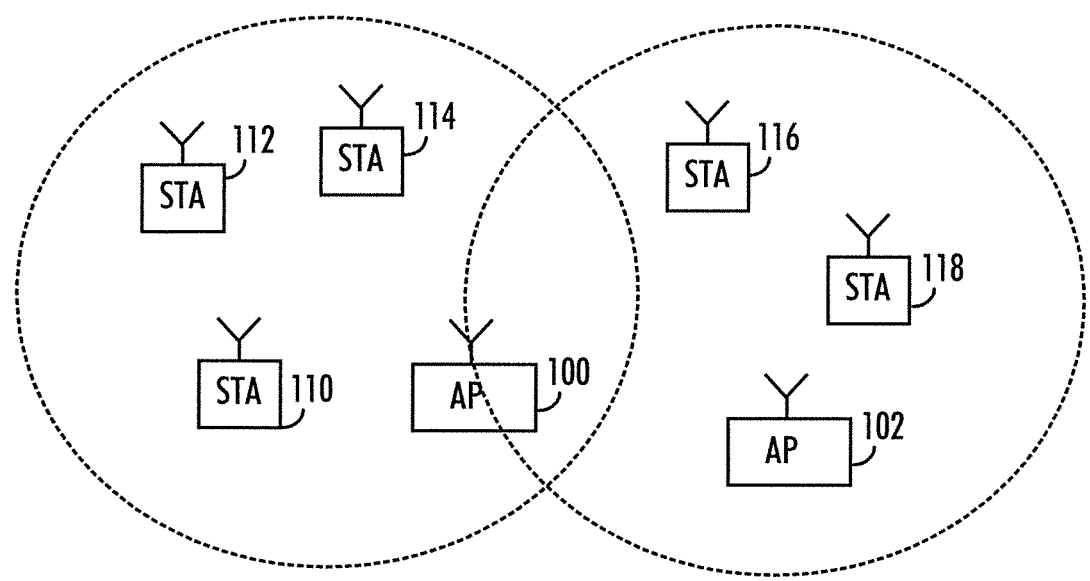
FIGS. 1A and 1B illustrate examples of wireless communication scenarios to which embodiments of the invention may be applied.

A general wireless communication scenario to which embodiments of the invention may be applied is illustrated in FIG. 1A. FIG. 1A illustrates an example of wireless communication devices comprising a plurality of access points (AP) 100, 102 and a plurality of wireless terminal devices (STA) 110, 112, 114, 116, 118. Each base station may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The APs 100, 102 may also provide access to other networks, e.g. the Internet. In another embodiment, the BSS may comprise a plurality of APs to form an extended service set (ESS). While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Tele-communication System), and other networks having cognitive radio features, e.g. transmission medium sensing features and adaptiveness to coexist with radio access networks based on different specifications and/or standards.

Let us consider an infrastructure BSS that includes an access point together with terminal devices. The access point may be configured to utilize one or more radio channels or frequencies in communication with the terminal devices. The access point 100, 102 is configured to inform terminal devices its presence by transmitting a beacon signal or a beacon frame at predetermined intervals on each channel it uses for communication. The beacon frame comprises information on the access point, its network, and other networks. Typically the predetermined interval is 100 time units (TU). The duration of one TU is 1,024 ms. A terminal device may tune to a channel and look for beacon frames. The process is denoted passive scanning. Upon finding a beacon frame the terminal device may attempt a connection with the access point by transmitting an authentication message. After receiving an authentication response message from the access point, the terminal device and the access point may exchange association messages after which the terminal device is said to be associated to the access point. The association messages may comprise at least one of the following messages: association request, association response, reassociation request, and reassociation response. The association may be followed by 802.1X authentication, IP address allocation and other application specific setup signaling.

Figure 1B:
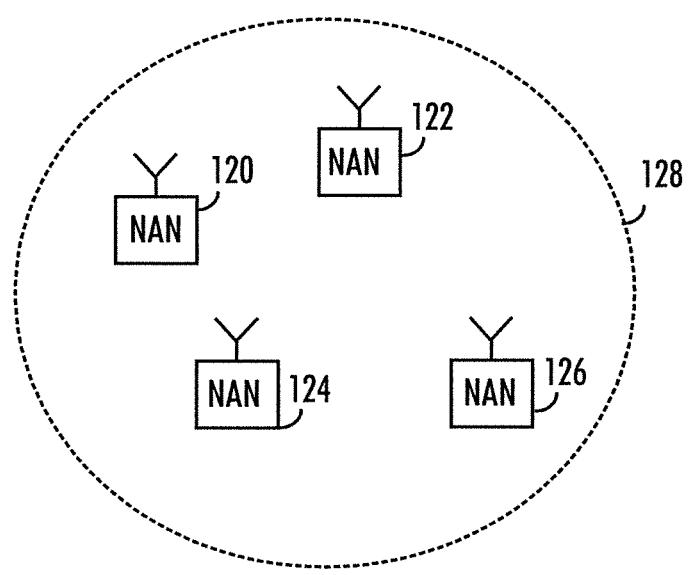

Another wireless communication scenario to which embodiments of the invention may be applied is illustrated in FIG. 1B. FIG. 1B illustrates a plurality of wireless devices 120, 122, 124, 126 that form a cluster 128 of devices. The cluster may comply with neighbour awareness networking (NAN) principles. NAN provides a mechanism for wireless devices to synchronize the time and channel on which they converge to facilitate the discovery of services that the devices may offer to other devices. The time period and channel on which NAN Devices converge is called the Discovery Window (DW). The wireless devices of a NAN cluster share a common set of NAN parameters that may comprise the time period between consecutive Discovery Windows, the time duration of the Discovery Windows, a beacon interval, and NAN Channel(s). The devices in a cluster may transmit multicast NAN Service Discovery frames directly to other devices within range in the same cluster during the Discovery Window. Devices may also communicate one to one with each other. A wireless device may belong to more than one cluster. In addition, a device may operate concurrently in a cluster and in a different WiFi network such as an infrastructure BSS of FIG. 1A.

In wireless communication systems there may be situations for a transceiver when it might be useful to be able to know the distance to another transceiver. Fine Time Measurement (FTM) is a ranging mechanism which has been proposed to be used in 802.11 based wireless systems.

In FTM, at least three frame pairs are required to complete the ranging process. First the initiating apparatus transmits a request to initiate distance measurement. The responding apparatus acknowledges the request. Then follow the actual ranging messages between the apparatuses. Both stations time stamp the transmission and reception times of these messages. The time stamps may be denoted as t1, t2, t3, and t4. The responding apparatus is configured to transmit at time instant t1 an FTM_1 message. The initiating apparatus receives the message at time instant t2 and transmits acknowledgement message at time instant t3. The responding apparatus receives the ACK transmitted by the initiating apparatus at time instant t4.

Finally, the responding apparatus transmits an FTM_2 message to inform the initiating apparatus on the transmission time t1 of the FTM_1 message and the reception time t4 of the corresponding ACK. After this message exchange, the initiating apparatus can determine distance to the responding apparatus.

If the wireless system comprises a large number of stations, the proposed currently specified FTM ranging solution is not optimum from spectrum efficiency viewpoint.

Figure 2:
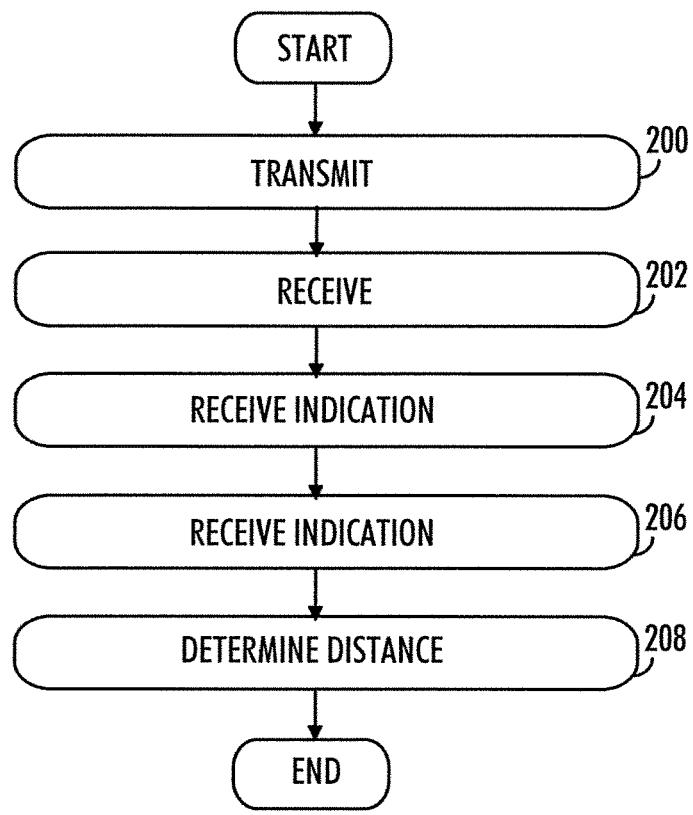
FIG. 2 is a flow chart illustrating an example of an embodiment.

FIG. 2 is a flow chart illustrating an example of an embodiment of the invention. The flowchart illustrates the operation of an apparatus which may be a wireless terminal device (STA) 110, for example.

In step 200, the apparatus is configured to transmit a first frame to a second apparatus. The second apparatus may be another wireless terminal device, for example.

In step 202, the apparatus is configured to receive a second frame from the second apparatus, as response to the first frame.

In step 204, the apparatus is configured to receive an indication of the duration between the reception time of the first frame and transmission of the second frame.

In step 206, the apparatus is configured to receive an indication whether the duration is constant or variable.

In case the duration is constant, the apparatus is configured in step 208 to determine the distance between the apparatus and the second apparatus based at least partly on the indication of the duration.

The above steps may also be in different order. For example, the reception of the indication whether the duration is constant or variable may occur before other steps. Further, the reception of the indication of the duration between the reception time of the first frame and transmission of the second frame may occur before transmitting the first frame and the second frame, since the duration may be constant and not dependent on any specific transmissions of the first frame and the second frame.

In prior art, the assumption is that the duration between the time instant t2 receiving a message such as FTM_1 message and the time instance t3 transmitting corresponding ACK varies. Thus, the assumption has been that only the initiating apparatus can calculate distance because it measures and knows t2 and t3.

However, in this proposal the assumption is that the t2–t3 duration can be constant in many cases. If an apparatus is able to respond with constant delay and willing other stations to calculate distance to it, it may inform the constant t3–t2 duration to other apparatuses. The constant t3–t2 duration can be included in the ACK frame or it may be included in some earlier message, for example. Such an earlier message may be a beacon, probe response, association response in infrastructure mode, for example. In non-infrastructure mode, other control, management, or data frames may disclose such an earlier message. If the apparatus is not able or willing to use constant delay, it may inform this shall inform that in the same message.

In an embodiment, the t3–t2 duration is determined to be constant if the variation of the duration is below a predetermined margin. For example, duration may be considered constant if it is a certain value +/− some margin, e.g. +/−1%, 5%, 10% or 20%, as an example.

In an embodiment, the t3–t2 duration may be variable, as discussed above. In an embodiment, the duration may be variable due to processing load or other non-intentional reason. In an embodiment, the duration may be variable to make it difficult for other devices to determine distance to the second apparatus 112. In such case, the t3–t2 duration may be randomized.

In an embodiment, it is possible to determine distance to another apparatus (having constant t2–t3) with single frame pair exchange (FTM-ACK).

Further, this enables passive stations (not participating to frame exchanges) to determine distances to at least one of the participating apparatus (having constant t2–t3).

Figure 3:
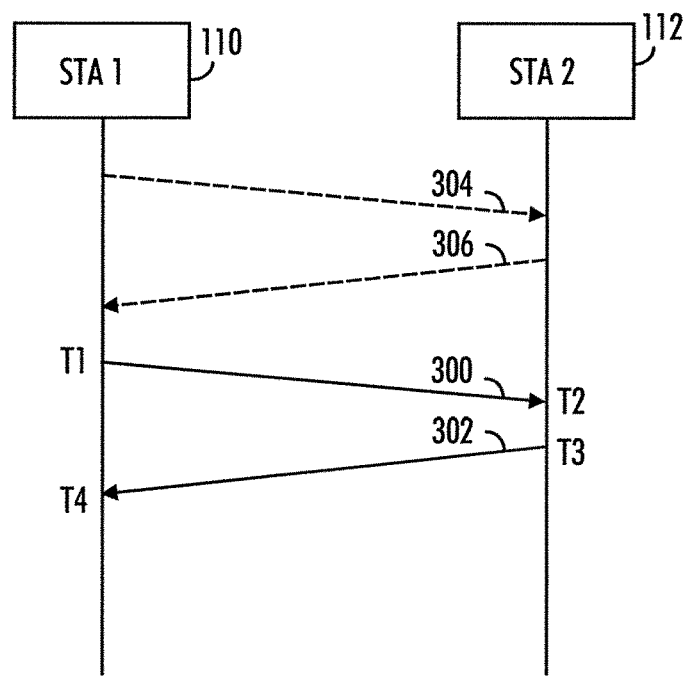
FIGS. 3 and 4 are signaling charts illustrating examples of some embodiments.

FIG. 3 is a signalling chart illustrating an example of an embodiment. The figure illustrates exchange of frames between two wireless apparatuses. In this example, the apparatuses are wireless stations 110, 112. The apparatuses may as well be devices of a NAN cluster.

The apparatus 110 may be denoted as first apparatus and the apparatus 112 as second apparatus.

The first apparatus 110 transmits a first frame 300 to a second apparatus 112. The first apparatus 110 stamps the time instant t1 of the transmission. The second apparatus may be another wireless terminal device, for example. The second apparatus 112 receives the first frame at time instant t2.

At time instant t3, the second apparatus transmits a second frame 302 to the first apparatus as response to the first frame. The second frame may be an acknowledgement frame. The second apparatus receives the second frame and the apparatus stamps the time instant t4 of the reception.

The first apparatus knows the time instants t1 and t4. In an embodiment, the second apparatus has indicated that duration t3–t2 is constant. It may have indicated the value of the duration t3–t2 to other apparatuses.

Thus, the first apparatus may compute the flight time over-the air of messages 300, 302 as RTT=(t4–t1)–(t3–t2). The distance between the apparatuses may be determined from RTT/2*c where c is the speed of light.

In an embodiment, the second apparatus 112 has signalled 306 the constant value of the duration t3–t2 to the first apparatus 110 (and possibly other apparatuses as well). In an embodiment, the first apparatus requested 304 the information from the second apparatus. This exchange of messages may be performed prior to the messages 300, 302.

In an embodiment, the second apparatus may apply a time varying t3–t2 duration. The total duration t3–t2 may comprise a constant part and a varying part. The second apparatus may include the varying part to the duration when it is desired that only a given recipient may determine the distance to the apparatus. The varying part may be an additional random delay. The second apparatus may have published the constant part of the t3–t2 delay but transmits information about the random delay only to the desired recipient.

The second apparatus may inform the first apparatus (and other apparatuses) the duration t3–t2 in various ways.

In an embodiment, the apparatus may indicate the duration between times t2 and t3 in a broadcast or unicast frame. The apparatus may provide the constant duration and the time varying or random information. This information may be provided to all wireless apparatuses (STAs) in proximity. The STAs in proximity may use the duration to range the distance from the measured STA to the passively ranging device.

In infrastructure mode, the AP may indicate its duration between T2 and T3 times in Association Response, Probe Response or in Beacon frame.

In an embodiment, second apparatus may add a field to the Acknowledgement message 306 to indicate that the t3–t2 delay is Short Interframe Space (SIFS) duration within a predefined granularity (+/−50 picoseconds). Alternatively the field may contain an unsigned integer that indicates the t3–t2 preciseness in units of +/−5 picoseconds. The overhearing devices that are performing passive FTM can use this information to estimate its distance between ranged devices and the preciseness of the estimation.

In an embodiment, a t3–t2 Duration field may be a signed integer that contains the difference of the t3–t2 duration to the SIFS duration in picoseconds. In an embodiment, a Variation t3–t2 Duration field indicates the variation of the t3–t2 time in an unsigned integer in units of pico seconds.

If the second apparatus adds a random delay to the t3–t2 interval, the apparatus may indicate the random delay in ACK frame 306.

In an embodiment, the apparatuses that are not able to know or are unwilling to reveal their t3–t2 delay at the time of the frame transmission may indicate that they have a random t3–t2 delay. This indication may help the receiving apparatuses to avoid the FTM measurement of such frames.

In an embodiment, the signalled information may contain an uniform resource locator URL or IP address through which the duration between times t3–t2 may be obtained. The information may consider the temperature, device type and other related parameters to provide the most accurate estimation of duration between t3–t2

Figure 4:
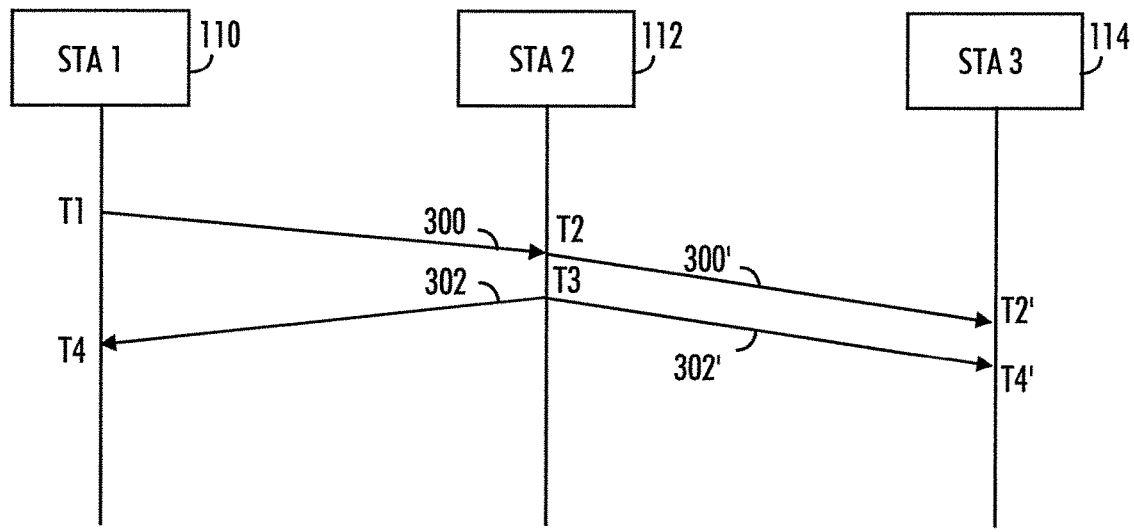

As mentioned, also those wireless apparatuses not participating in the frame exchange may obtain location information on the basis of the suggested procedure. FIG. 4 illustrates this example. An apparatus 114 may for example overhear the message 300 transmitted by first apparatus 110 and the ACK transmission 302 by second apparatus 112. This apparatus 114 may be denoted as a Passive FTM STA. The passive FTM STA may obtain the time of arrival t2' of the frame 300' and the time of arrival t4' of the ACK frame 302' to its location. It may be noted that the t2 and t2' as well as t4 and t4' have different values depending on the positions of the second apparatus and Passive FTM STA.

In an embodiment, the message 300 may be an FTM message. In another embodiment, the message 300 may be any message that needs to be acknowledged by the message 302.

As FIG. 4 shows, t2' indicates the time when Passive FTM STA receives the frame 300' transmitted by the first apparatus. The t4' is the time when the Passive FTM STA 114 receives the frame 302' from second apparatus. If the Passive FTM STA obtains both values t2' and t4', it may calculate a distance ((t4'−t2')−(t3−t2))*c. The STA 114 may calculate roughly estimate for differential distance D which is the difference in STA 114's distance to STA 110 and STA 112. If at a different time instant STA 114 receives distance determination related signalling between STA 110 and some other apparatus and between STA 112 and the other apparatus, TSA 114 may apply hyperbolic navigation methods (for example) to calculate absolute distances between STA 114 and the other apparatuses.

Figure 5:
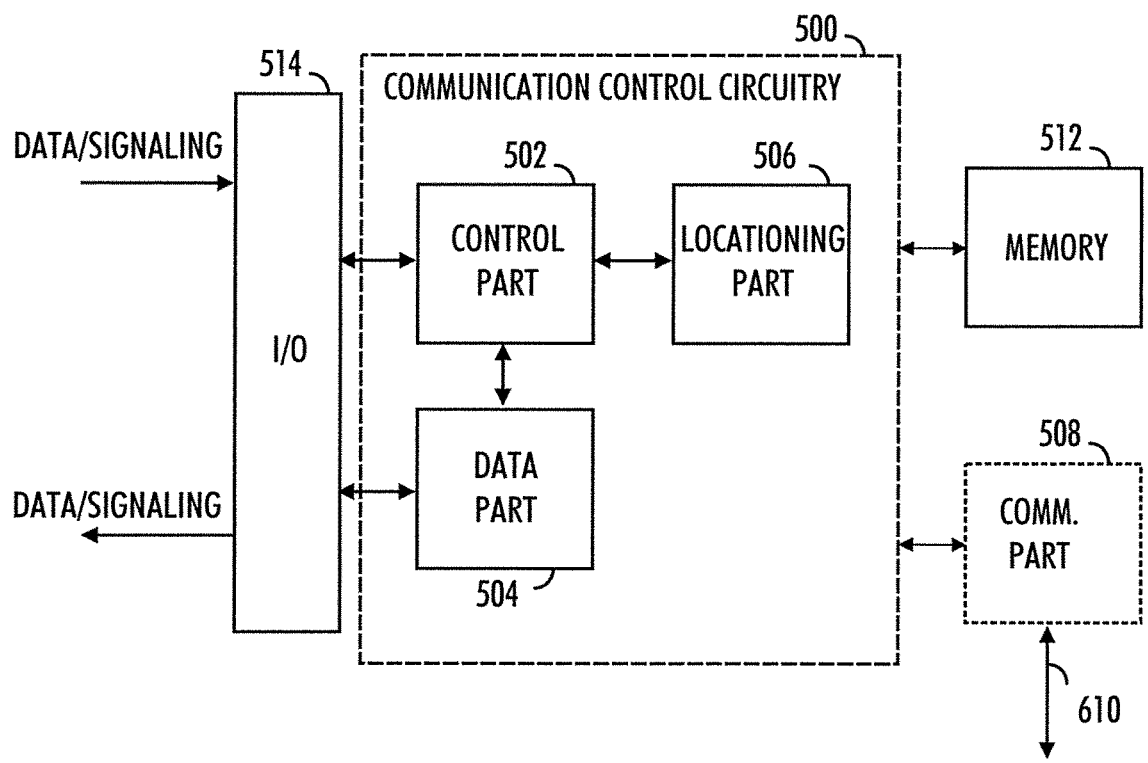
FIG. 5 illustrates a block diagram of an apparatus according to some embodiments.

FIG. 5 illustrates an embodiment of an apparatus comprising means for carrying out the above-mentioned functionalities. In an embodiment, the apparatus is an access point or a part of an access point. The apparatus may be a wireless device which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a base station with routing functionalities, or any other apparatus provided with radio communication capability. In an embodiment, the apparatus carrying out the above-described functionalities of the access point is comprised in such a wireless device, e.g. the apparatus may comprise a circuitry, e.g. a chip, a processor, a micro controller, or a combination of such circuitries in the wireless device.

Referring to FIG. 5, the apparatus may comprise a communication controller circuitry 500 configured to control wireless communications in the wireless device. The communication controller circuitry 500 may comprise a control part 502 handling control signalling communication with respect to transmission, reception, and extraction of control or management frames including the beacon frames, fast initial link setup frames, measurement pilot frames, and probe response messages, for example. The communication controller circuitry 500 may further comprise a data part 504 that handles transmission and reception of payload data during transmission opportunities of the wireless device (transmission) or transmission opportunities of other wireless devices (reception).

The communication controller circuitry 500 may further comprise a locationing part 506 configured to control operations related to locationing messages and determining distances to nearby apparatuses on the basis of messages. In an embodiment, the control part 502 forwards information related to locationing messages to the locationing part 506. The locationing part may be responsible for maintaining information on t3–t2 delays of nearby apparatuses that the apparatuses have indicated to be constant.

In an embodiment, the communication channel utilized by the apparatus is a wireless local area network channel. In an embodiment, the communication channel is defined by a center frequency and a channel width. In an embodiment, the communication channel has a 20 Mhz channel width. In an embodiment, the communication channel is a primary channel according to IEEE 802.11 specs, e.g. IEEE 802.11-2012.

If the apparatus is an access point, the apparatus may further comprise a communication part 508 configured to communicate 510 with other network elements such as other access points, network controllers and networks.

The circuitries 502 to 506 of the communication controller circuitry 500 may be carried out by the one or more physical circuitries or processors. In practice, the different circuitries may be realized by different computer program modules. Depending on the specifications and the design of the apparatus, the apparatus may comprise some of the circuitries 502 to 506 or all of them.

The apparatus may further comprise the memory 512 that stores computer programs (software) configuring the apparatus to perform the above-described functionalities of the access point. The memory 512 may also store communication parameters and other information needed for the wireless communications within a wireless network of the access point and with other wireless networks.

The apparatus may further comprise radio interface components 514 providing the apparatus with radio communication capabilities within its wireless network and/or with other wireless networks. The radio interface components 514 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 4 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method in a first apparatus, comprising:
    transmitting a first frame to a second apparatus;
    receiving a second frame from the second apparatus in response to the first frame;
    receiving an indication of a duration between a reception time of the first frame and transmission of the second frame;
    receiving an indication whether the duration is constant or variable; and
    in case the duration is constant, determining a distance between the first apparatus and the second apparatus based at least partly on the indication of the duration.

2. The method of claim 1, further comprising:
    deciding not to determine the distance between the first apparatus and the second apparatus, in case the duration is variable.

3. The method of claim 1, further comprising:
determining the distance between the first apparatus and the second apparatus based at least partly on a transmission time of the first frame and the reception time of the second frame.

4. The method of claim 1, wherein the indication of the duration and the indication whether the duration is constant or variable is received in the second frame or in an third frame.

5. The method of claim 4, wherein the third frame is at least one of a beacon, a probe response, and an association response.

6. The method of claim 4, wherein the third frame is received prior to the transmission of the first frame.

7. The method of claim 1, wherein the second frame is an acknowledgement frame.

8. The method of claim 1, further comprising:
receiving from the second apparatus, prior to transmitting the first frame, a request to transmit the first frame.

9. The method of claim 1, further comprising:
determining the distance between the first apparatus and the second apparatus if the variation of the duration is below a predetermined margin.

10. A method in an apparatus, comprising:
receiving a first frame from a first apparatus;
receiving a second frame from the second apparatus in response to the first frame;
receiving an indication of a duration between the reception time of the first frame and transmission of the second frame;
receiving an indication whether the duration is constant or variable; and
in case the duration is constant, determining a parameter related to a difference between a distance between the apparatus and the first apparatus and a distance between the apparatus and the second apparatus based at least partly on the indication of the duration.

11. An apparatus comprising at least one processor and at least one memory including computer program code, the at least one memory and the computer program code configured, with the at least one processor, to cause the apparatus at least to:
transmit a first frame to a second apparatus;
receive a second frame from the second apparatus in response to the first frame;
receive an indication of a duration between a reception time of the first frame and transmission of the second frame;
receive an indication whether the duration is constant or variable; and
in case the duration is constant, determine a distance between the apparatus and the second apparatus based at least partly on the indication of the duration.

12. The apparatus of claim 11, the at least one memory and the computer program code, with the at least one processor, further configured to:
decide not to determine the distance between the first apparatus and the second apparatus, in case the duration is variable.

13. The apparatus of claim 11, the at least one memory and the computer program code, with the at least one processor, further configured to:
determine the distance between the first apparatus and the second apparatus based at least partly on a transmission time of the first frame and the reception time of the second frame.

14. The apparatus of claim 11, wherein the indication of the duration and the indication whether the duration is constant or variable is received in the second frame or in an third frame.

15. The apparatus of claim 14, wherein the third frame is at least one of a beacon, a probe response, and an association response.

16. The apparatus of claim 14, wherein the third frame is received prior to the transmission of the first frame.

17. The apparatus of claim 11, wherein the second frame is an acknowledgement frame.

18. The apparatus of claim 11, the at least one memory and the computer program code, with the at least one processor, further configured to:
receive from the second apparatus, prior to transmitting the first frame, a request to transmit the first frame.

19. The apparatus of claim 11, the at least one memory and the computer program code, with the at least one processor, further configured to:
determine the distance between the first apparatus and the second apparatus if the variation of the duration is below a predetermined margin.

20. An apparatus comprising at least one processor and at least one memory including computer program code, the at least one memory and the computer program code configured to, with the at least one processor, cause the apparatus at least to:
receive a first frame from a first apparatus;
receive a second frame from the second apparatus in response to the first frame;
receive an indication of a duration between the reception time of the first frame and transmission of the second frame;
receive an indication whether the duration is constant or variable; and
in case the duration is constant, determine a parameter related to a difference between a distance between the apparatus and the first apparatus and a distance between the apparatus and the second apparatus based at least partly on the indication of the duration.

* * * * *